United States Patent
Moilala et al.

(10) Patent No.: US 8,522,859 B2
(45) Date of Patent: Sep. 3, 2013

(54) PHASE CHANGE MATERIAL HEAT EXCHANGER

(75) Inventors: Kari Moilala, Kajaani (FI); Michael Gasik, Helsinki (FI)

(73) Assignee: MG Innovations Corp., Kajaani (FI)

( * ) Notice: Subject to any disclaimer, the term of this patent is extended or adjusted under 35 U.S.C. 154(b) by 1469 days.

(21) Appl. No.: 11/886,104

(22) PCT Filed: Oct. 10, 2006

(86) PCT No.: PCT/FI2006/050434
§ 371 (c)(1), (2), (4) Date: Sep. 10, 2007

(87) PCT Pub. No.: WO2007/042621
PCT Pub. Date: Apr. 19, 2007

(65) Prior Publication Data
US 2008/0179039 A1     Jul. 31, 2008

(30) Foreign Application Priority Data

Oct. 10, 2005  (FI) ..................................... 20051018
Oct. 10, 2006  (FI) ..................................... 20060896

(51) Int. Cl.
| F28D 17/00 | (2006.01) |
| F28D 19/00 | (2006.01) |
| F25B 29/00 | (2006.01) |
| F25B 9/02  | (2006.01) |

(52) U.S. Cl.
USPC ............. 165/6; 165/7; 165/10; 165/201; 62/5

(58) Field of Classification Search
USPC ..................... 165/4, 6, 7, 10, 200, 201; 62/4, 62/5, 238.6
See application file for complete search history.

(56) References Cited

U.S. PATENT DOCUMENTS

| 3,788,064 A * | 1/1974 | Hawkins ......................... 60/671 |
| 3,898,978 A * | 8/1975 | Marcus .......................... 126/204 |

(Continued)

FOREIGN PATENT DOCUMENTS

| DE | 3825155 | 12/1988 |
| EP | 1455156 | 9/2004  |
| EP | 1455157 | 9/2004  |

OTHER PUBLICATIONS

"Vortex Tube" [online]. Course Manual, Thermal Science Laboratory, ME 2131, Mechanical Engineering Department, School of Engineering and Applied Sciences, Southern Methodist University, Spring 2001. [Retrieved on Jan. 25, 2013]. Retrieved from the Internet: <URL: http://lyle.smu.edu/me/2131/Thermolab/vortex/vortex.html>.*

*Primary Examiner* — Ljiljana Ciric
(74) *Attorney, Agent, or Firm* — Ware, Fressola, Maguire & Barber LLP

(57) ABSTRACT

A phase change material (PCM) heat exchanger device comprising heat exchanger cells (1a, 1b) operating on the regenerative countercurrent principle, one or more phase change material (PCM) accumulators (2, 3) provided in the heat exchanger cells and one or more vortex tubes (6, 7, 8). When the directions of the air, gas and liquid flows are cyclically reversed in the apparatus, energy is recovered into the heat exchanger cell and the PCM accumulator, and during the subsequent cycle, the energy is released from the heat exchanger cell and PCM accumulator. While one heat exchanger cell and PCM accumulator is being charged, the other heat exchanger cell and PCM accumulator is simultaneously discharged. Warm air exits a first outlet port while cold air exits a second outlet port of the one or more vortex tubes. The fluid flows heat or cool the heat exchanger cells and associated PCM accumulators.

14 Claims, 2 Drawing Sheets

(56) References Cited

U.S. PATENT DOCUMENTS

| | | | | |
|---|---|---|---|---|
| 3,922,871 A | * | 12/1975 | Bolesta | 62/5 |
| 3,982,378 A | * | 9/1976 | Sohre | 62/5 |
| 4,402,188 A | * | 9/1983 | Skala | 165/10 |
| 4,407,134 A | | 10/1983 | Snaper | |
| 4,593,534 A | * | 6/1986 | Bloomfield | 62/201 |
| 4,646,524 A | * | 3/1987 | Kawashima et al. | 62/5 |
| 4,693,089 A | * | 9/1987 | Bourne et al. | 62/238.6 |
| 5,572,872 A | * | 11/1996 | Hlavacek | 62/3.6 |
| 5,901,572 A | | 5/1999 | Peiffer et al. | |
| 5,966,942 A | * | 10/1999 | Mitchell | 62/6 |
| 6,158,237 A | * | 12/2000 | Riffat et al. | 62/484 |
| 6,250,086 B1 | * | 6/2001 | Cho et al. | 62/5 |
| 6,293,108 B1 | * | 9/2001 | Cho et al. | 62/5 |
| 6,389,818 B2 | * | 5/2002 | Cho et al. | 62/5 |
| 6,401,463 B1 | * | 6/2002 | Dukhan et al. | 62/5 |
| 6,425,249 B1 | * | 7/2002 | Cho et al. | 62/5 |
| 6,430,937 B2 | * | 8/2002 | Cho et al. | 62/5 |
| 6,449,964 B1 | * | 9/2002 | Cho et al. | 62/114 |
| 6,516,617 B1 | * | 2/2003 | Schwieger | 60/679 |
| 6,524,368 B2 | * | 2/2003 | Betting et al. | 95/29 |
| 6,776,825 B2 | * | 8/2004 | Betting et al. | 96/389 |
| 6,958,107 B1 | * | 10/2005 | Clarke et al. | 159/2.1 |
| 7,059,385 B2 | | 6/2006 | Moilala | |
| 7,260,940 B2 | * | 8/2007 | Watanabe et al. | 62/4 |
| 7,565,808 B2 | * | 7/2009 | Sullivan | 62/5 |
| 7,669,428 B2 | * | 3/2010 | Federov et al. | 62/5 |
| 7,861,541 B2 | * | 1/2011 | Dieckmann et al. | 62/87 |
| 8,099,966 B2 | * | 1/2012 | Mossberg et al. | 62/5 |
| 8,151,872 B2 | * | 4/2012 | Di Stefano | 165/201 |
| 2002/0073848 A1 | | 6/2002 | Cho et al. | |
| 2005/0155355 A1 | * | 7/2005 | Watanabe et al. | 62/4 |
| 2006/0230765 A1 | * | 10/2006 | Fedorov et al. | 62/5 |
| 2011/0252815 A1 | * | 10/2011 | Bakos | 62/5 |

* cited by examiner

PHASE CHANGE MATERIAL HEAT EXCHANGER

CROSS REFERENCE TO RELATED APPLICATIONS

This application is the U.S. National Stage of International Application Number PCT/FI06/050434 filed on Oct. 10, 2006 which was published in English on Apr. 19, 2007 under International Publication Number WO 2007/042621.

TECHNICAL FIELD

This invention relates to a heat exchanger comprising a regenerative heat exchanger operating on the counter-current principle and of a phase change material (PCM) enthalpy accumulator in the heat exchanger and/or a vortex tube taking advantage of the Venturi phenomenon. The system provides pre-cooling and pre-drying of fresh ventilation air in the summer and for preheating and pre-moisturising of fresh ventilation air in the winter. The system can be used without ventilation as well. In addition to buildings, the present invention can be used with vehicles, industrial and commercial equipment rooms, as well as any closed compartments which require controlled climatic conditions, for instance for cooling in processes and apparatus such as computers and telecom equipment. Besides air or gas cooling, the heat exchanger is applicable for enhancement of heat transfer in liquids.

BACKGROUND OF THE INVENTION

On the global scale, energy is abundantly used for cooling, opposing the natural tendency of thermal energy to pass towards a cooler object. As the climate warms up, cooling and dehumidification will require more energy.

Conventional compressor cooling is a highly power consuming/energy demanding method. Absorption cooling among other things takes efficient advantage of waste heat. The thermoelectric unit based on the Seebeck phenomenon converts heat into electricity, however, it has high production costs, thus becoming inappropriate for objects requiring larger amounts of energy.

In addition to buildings, vehicles and industrial processes, temperature control is also vital in heat-generating devices, such as computers.

Ventilation is important, but often it is impossible to use, for example, in places with polluted air, such as in shops on the street level. In many applications, like cooling of computers, ventilation is unnecessary.

In a PCM heat storage, known per se, material phase changes are generally between a solid state and a liquid state. Such storages are usually maintained in the temperature range 0-100° C., thus being suitable for short-term energy storage when connected to heaters and coolers. Typical media comprise water/ice, salt brines, inorganic salt hydrates, saturated hydrocarbons and fatty acids of high molecular weight. PCM storage units have the benefits of a small size, compared e.g. to storage units for water alone, and do not have any moving parts. PCM materials have recently been utilised for the heating and cooling of cloth used for wearing apparel. One drawback of PCM storages is caused by their poor heat conductivity. PCM storages can also be given a plate-like shape. Heat discharges from the PCM storage constitute a major problem, because further heat cannot be stored unless it has first been discharged. The PCM operation is thus based on cyclic charges and discharges. One of the advantages of PCM materials is their operation with small temperature differences. If the temperature between outdoor and indoor air of ventilation is same, of course phase change does not take place.

The cooling demand in buildings depends on three components: the heat load caused by outdoor air, by indoor air and by ventilation. Heat recovery operating on the counter-current principle has proved to yield higher efficiency than a system operating on the forward-current principle (See e.g. U.S. Pat. No. 7,059,385). In a regenerative system, heat is stored effectively in heat recovery cells.

In recuperative cross-current plate heat exchangers, air currents are not reversed, and hence they cannot interact optimally with a PCM storage nor with a regenerative rotating heat recovery cell.

A stationary, regenerative and accumulating storage cell system operating on the counter-current principle is straightforward and effective. The cell system may be made of any material having high thermal storage (heat capacity), such as aluminium or copper. Also one rotary type regenerative heat exchanger can be used that alternately rotates between two counter (air) flows, thereby substituting for two heat exchanger cells, although efficiency is lower and the construction quite complicated and expensive.

A vortex tube or similar device, known per se, takes advantage of the Venturi phenomenon. The vortex tube has one inlet port and first and second outlet ports at opposite ends of a tube arranged perpendicular to the inlet port. A compressible fluid such as air enters the inlet port and heated air exits the first outlet port while cooled air exits the second outlet port. The vortex tube has no moving parts. For example, if 21° C. air enters the inlet port, 76° C. air can exit the first outlet part and −34° C. can exit the second outlet port.

Instead of vortex tube, conventional technology such as a compressor can be used to create a thermal difference, but then the efficiency is lower. If the vortex tube is used alone, the capacity is typically not economical for cooling/heating large spaces.

In patents DE 3825155, U.S. Pat. No. 4,407,134 and published US application US 2002073848, a vortex tube is mentioned as a separate device used for production of a cool air stream on one side and a hot air stream on the other side. This tube is also not connected to any heat exchanger either with the PCM or without, because its continuous principle of operation does not allow the vortex tube to be connected with a device which operates periodically, as in the present invention. In EP 1455157 PCM is mentioned as a heat storage media only, but it is not connected to an external vortex tube unlike the present invention.

SUMMARY OF THE INVENTION

The present invention has the purpose of creating a regenerative heat exchanger which can be used in most conditions, even where the external fluid is not available; and in particular, in conditions where the thermal difference of outgoing and incoming fluids is not sufficient to assure the phase change effect of PCM.

The invention is applicable to heat transfer between air, other gases and liquids.

Latent heat is not observed as the temperature increases, since it is the energy required for a material to pass from one physical state to another, such as from ice to water and from water to vapour. Such state changes may be endothermic, i.e. they bind (absorb) thermal energy, or exothermic, i.e. they release thermal energy. Thus, for instance, the energy required for water evaporation is released when the vapour is re-condensed in the form of liquid water.

In accordance with the invention, one PCM accumulator is added to at least one heat recovery cell, the heat stored in the accumulator being released when the air flow directions are reversed. Each accumulator and the heat recovery material are connected such that the heat transfer can take place as efficiently as possible. This is important concerning air and gas handling due to condensation and evaporation of humidity. It should be noted that to use heat recovery material is not as important regarding liquid handling. The apparatus comprises two enthalpy recovery cells, in which the fluid flow directions are alternately reversed. At the first end of the device a vortex tube may be located, from which hot/cold fluid is lead out of a first outlet port through a chamber to the PCM. Simultaneously the second flow from the vortex tube is lead out of a second outlet port to a second PCM (if present) or to outside space.

In accordance with the invention, for a heat exchanger, the initial phase change of the PCM is created quickly by the temperature of the air exiting the vortex tube. When the phase state is changed, the vortex tube is turned off, for example, it can be regulated by temperature, and its operation is no longer required. There are many ways to use the hot and cold flows of vortex tube; namely, where heated air or cooled air can be lead to an outlet or inlet of the device. Which manner is used depends on economics. The second output port flow from the vortex tube, might lead to the cell. If not, it is lead out to outside space, or to heat/cool something else, such as, water. The flow from the first outlet port is lead to the heat exchanger of the device, where the PCM is located. During the second cycle the first flow cold or warm fluid may be lead through the other heat exchanger/PCM. The flow, which is not led through the heat exchanger/PCM can be lead to the outside space. The air then is hot or cold. Thus the thermal difference is created quickly and efficiently by vortex tube.

PCM accumulator materials are available for certain ranges of temperatures. Air-conditioning units can be used in cold and warm outdoor conditions. Therefore several PCM accumulator materials are required. Additionally, for example, an exhaust air heat pump does not efficiently operate in cold conditions. Using a vortex tube as mentioned above as a pre-heater/cooler, only few PCM accumulator materials are needed due to the vortex tube making incoming fluid's temperature quite stable and optimal before PCM accumulator material.

The vortex tube can be located for example at both ends of the device or in the middle between the heat exchangers and PCMs. The phase change heat exchanger device is more precisely discussed in claim 1.

In accordance with the invention the vortex tube can be used with ventilation in cases where the temperature difference of indoor and outdoor air is not enough to create the phase change of the PCM.

The system of the invention has higher efficiency—a coefficient of performance (COP) up to 9.0—than that of conventional cooling apparatuses—COP average of 2.7. The Seasonal energy efficiency ratio (SEER) of the invention is relatively more even due to non-freezing in the winter and free of charge evaporation in the summer. The invention remarkably decreases the peak load of electric power both in the winter and in the summer. This is a very important issue regarding states e.g., China, which often lack sufficient electrical power.

The apparatus of the invention is inexpensive, relatively quiet, light, maintenance-friendly, and it does not contain hazardous substances.

In accordance with the invention the device needs only three fans to operate, namely two for recycling or ventilating the air/fluid (two fans/pumps of nearly equal capacity are needed to balance fluid flow and to avoid pressure drops), and one for the vortex tube. The use of energy is very low and therefore the electric connection power requirement is low as well. This makes possible use of low-power sources such as solar panels, for example, in the transportation containers as well as remote telecom base stations.

The compressor driven cooler of cars require that the engine be running when using the compressor. The air is then polluted even if the car is not moving. In accordance with the invention, inside air cooling is possible with low power drain if the engine is off. In closed isolated environments such as submarines or clean rooms, a low noise level is an additional basic requirement, when the fresh air supply is not available. This low noise level can be achieved with the present invention.

In conventional ventilation, heat recovery devices and coolers have long payback times. In addition to the initial costs, traditional heat recovery ventilators and heat pumps utilising outdoor air cannot operate without additional external energy at temperatures below zero Celsius. Indoor air heat pumps, are again of no use when the outdoor air is warmer than the indoor air. Consequently, such devices will have very short operation periods per year (either in winter or summer, but not through the year). Should it be necessary to use both systems together with an air drier or humidifier, the costs would be even higher. Calculated in terms of the hot zones in the United States and of their average electricity tariffs, the ventilation device of the present invention may have a payback time of less than a year. The excellent seasonal performance factor (SPF) is due to the long period of use each year, i.e. throughout the year in practice, since the apparatus operates both in the winter and in the summer.

BRIEF DESCRIPTION OF THE DRAWINGS

The invention is explained below by means of an example and with reference to the accompanying drawings, wherein.

DETAILED DESCRIPTION

Figure 1:
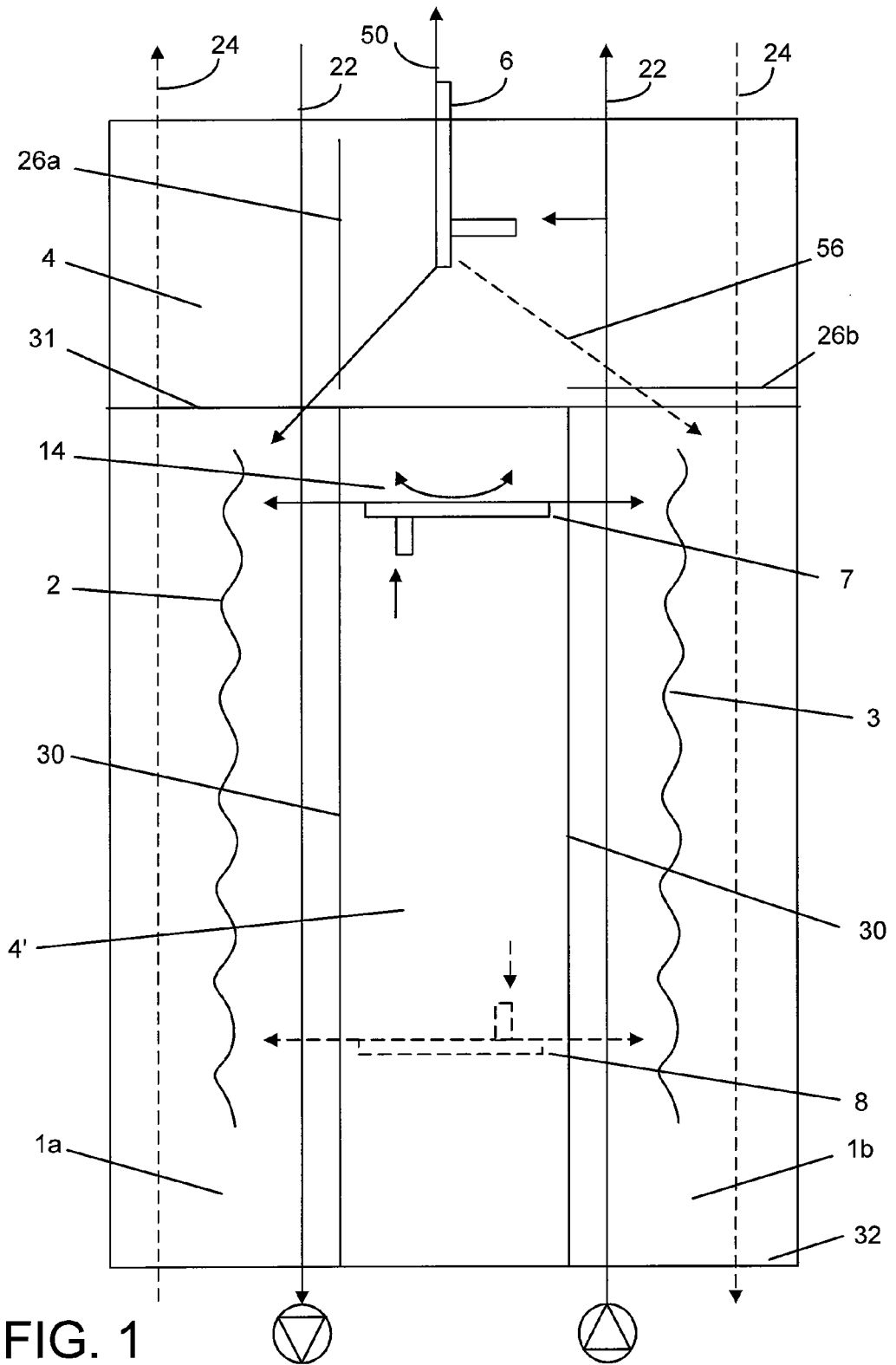
FIG. 1 is a schematic view of a PCM heat exchanger device of the present invention showing its fluid flows.

As seen in FIG. 1, a PCM heat exchanger device according to the present invention comprises at least two regenerative heat exchange cells 1a and 1b operating on the regenerative counter-current principle, through which air, gases or liquids flows are directed to and from the device with alternating and cyclically reversed opposite flow directions. Air flows are shown by arrows 22 and 24. The solid arrows 22 show air flow in one cycle while dashed arrows 24 shows air flow during a second cycle. The change in direction for the air flows in cells 1a and 1b can be performed by known techniques; e.g. diverters, fans, reflectors, flaps, or rotary wheel diverters. These known techniques for changing the air flow direction in the cells 1a and 1b are schematically shown by items 26a and 26b.

Alternatively, a single rotary type regenerative heat exchanger can be used when modified for two cell air flows, but efficiency is not as good as two heat exchangers.

The heat exchangers (cells) (1a and 1b) are placed next or near to each other and are separated so as to prevent mixing of these flows and excess thermal conduction. One or more cells made of or containing some phase change material, i.e, PCM accumulators (2, 3) are mounted in the heat exchangers (1a and 1b). When hot fluid enters one of the cells (e.g., 1a), it transfers its energy (enthalpy) to this heat exchanger cell (1a) and may change the state of the material in the PCM accumulator (2). This entails a temperature change of the flowing fluid. The heat exchangers may be made of a highly heat conductive material, such as aluminium or copper, preferably also having a high heat capacity. The heat exchangers (1a, 1b) can be in the middle of the device. They (1a, 1b) are separated from each other and from the device by walls (30), and walls (31 and 32) at both ends of the cells with openings for the illustrated air flows. The PCM accumulator (2, 3) may be designed so as to generate enough turbulence of the moving fluid. When sufficient heat from the entering fluid has been accumulated, or the phase of the PCM accumulator (2, 3) is changed, the directions of the fluid flows are reversed, so that colder fluid is heated while passing through the warm cell (1a, 1b) and vice versa. Heat is also released into the fluid flow from the PCM accumulator (2 or 3), if at the previous cycle it has been stored due to phase change effect.

The cyclic operation can be optimised in terms of the temperature, among other things. In the case of air flow, water vapour contained in the air during such cycles is condensed onto the surface of the corresponding cell, and during the subsequent cycle, it returns into the air by evaporation. The energy needed for evaporation is supplied from the cell and the PCM accumulator (2 or 3), air is thus cooled and PCM accumulator's (2 or 3) phase changes for example from liquid so solid. During the following cycle, the hot air is cooled upon reaching the cold cell and the PCM accumulator (2 or 3), and at the end of the cycle, the cold cell is heated and PCM accumulator's (2 or 3) phase is changes once again, now from solid to liquid, resulting in the air current directions being reversed once more. Consequently, a plurality of PCM accumulators (2, 3) may be provided in different temperature ranges, say, with one accumulator starting to operate when another has stopped, or with one operating in cold conditions while the other operates in warm conditions. PCM accumulators (2, 3) may be provided in only one of the heat exchanger cells; however, higher efficiency is achieved with at least one PCM accumulator (2, 3) in both of the heat exchanger cells (1a and 1b), so that one accumulator is continually charged while the other one is discharged. Heat can also be charged/discharged into/from a PCM accumulator (2, 3) using an additional liquid circulation system (a secondary circuit) allowing heat to be utilised for other purposes such as water heating. The invention is suitable in buildings and vehicles, but also for heat management in industrial processes and devices, such as computers, power electronics, and so on.

The PCM accumulator takes advantage of latent heat. On the other hand phase change requires a lot of energy. This temperature difference/heat is created/enhanced by the vortex tube (6-8) comprising a hollow tube. The vortex tube can be located in a fluid tight chamber (4), or in a region (chamber) 4' between the cells (1a and 1b). Into the vortex tube (6-8) compressed air is lead tangentially into inlet port (40). Warm air exits first outlet port (42) while cold air exits a second outlet port 44. The fluid flows heat or cool cells (1a and 1b) and associated PCM accumulators (2, 3). The flow from the vortex tube (6-8) not used in the process can be lead to outside space (50) or it can be used to cool/heat, for example water. Also this other flow from vortex tube (6-8) can be used in the process. Normally only one vortex tube (6-8) is used in a device.

Figure 2:
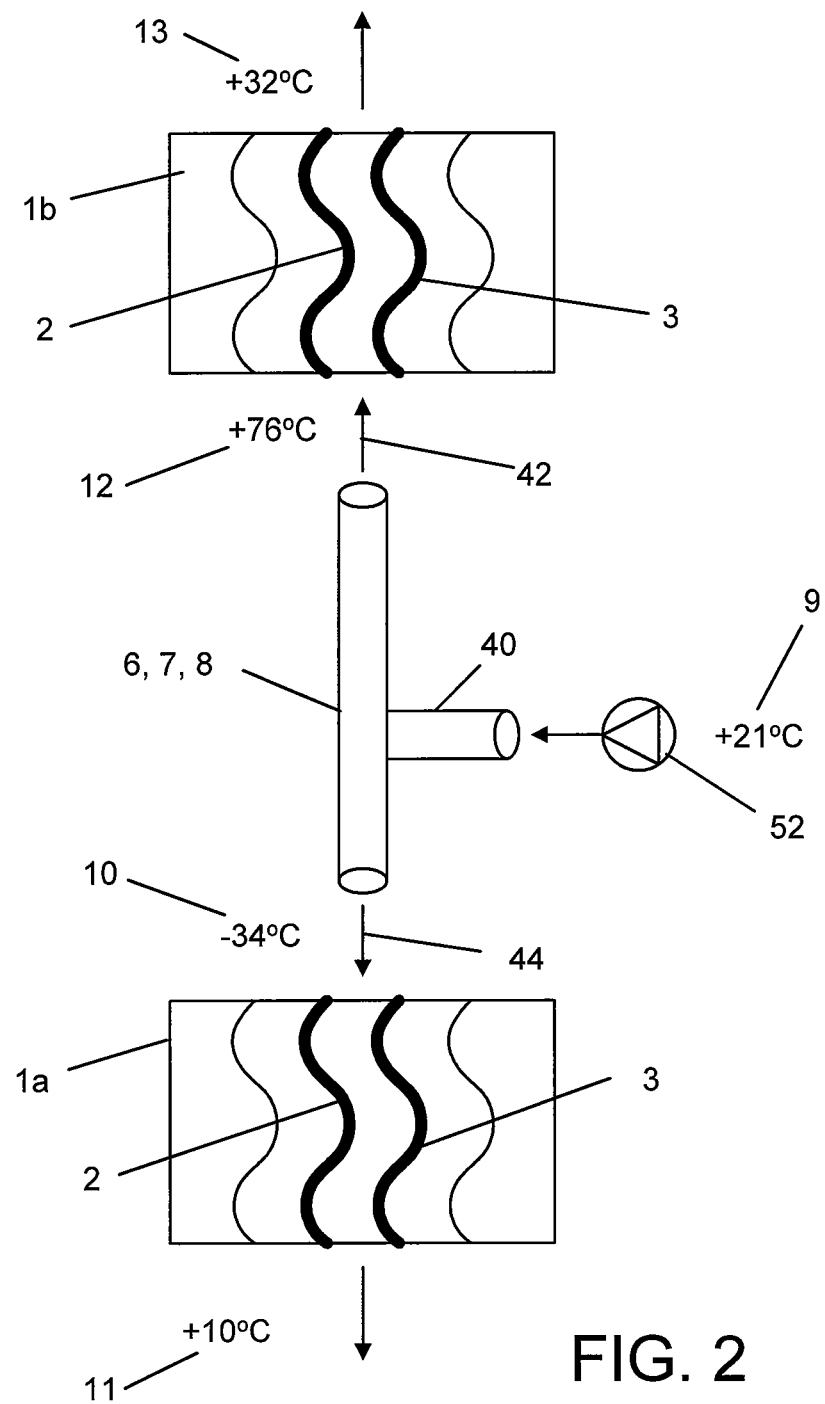
FIG. 2 is a schematic view of the vortex tube, illustrating fluid flows and heat exchangers and phase change materials for different operating temperatures in accordance with the present invention.

For example, as shown in FIG. 2, air of 21° C. (9) is guided by a fan/compressor/pump (52) (pressure 6-7 bar) into one vortex tube (6-8) at inlet port (40). From the first outlet port (42) of the vortex tube the flowing fluid is at +76° C. (12) when it enters into heat exchanger cell (1b). The PCM accumulator (3) is in solid form. When warm fluid flows through heat exchanger cell (1b) and PCM accumulator (3), the phase of the PCM accumulator (3) changes from solid to liquid. When the fluid is flowing out of the heat exchanger cell (1b) its temperature has dropped to +32° C. (13). The thermal energy and enthalpy is absorbed into heat recovery material such as aluminium or copper and PCM accumulator material (3). The other PCM accumulator (2) does not react to the temperature since it operates in the different range of temperatures. From the second outlet port (44) of the vortex tube the flowing fluid has a temperature outlet port (44) of −34° C. (10). The arrangement is such as on the other side of vortex tube—above mentioned—except the PCM accumulator material (2) phase changes from liquid to solid due to cool fluid (10). During the process the temperature of the fluid increases from −34° C. to +10° C. The PCM accumulator (2) has released heat energy which was stored during the previous cycle. The other PCM accumulator (3) does not react since the temperature is not suitable for its phase change.

The invention uses the phase change of the material (PCM) cyclically reversing the process for example between solid and liquid-latent heat of fusion.

The energy used for phase change of material is called latent heat. The invention uses (absorbs) heat to create two phase changes at the same time—on the first outlet port (42) of vortex tube (6-8) for example from solid to liquid (2) and at the same time on the second outlet port (44) of the vortex tube (6-8) from liquid to solid (3). Additionally the invention takes advantage of phase change of humidity during condensation and evaporation on the surface of the heat exchanger (1a, 1b). Based on this the efficiency of the invention is very high.

When these phase changes have taken place, the flows through the heat exchangers (1) are reversed. Also the flows (10, 12) of the vortex tube (6-8) must be changed. This can be arranged by for example guiding into the heat exchanger (1) flowing fluid by a valve, piping or plate (see dashed arrow 56), or by use of several different vortex tubes (7, 8) used cyclically, (when the first is on, the other is off, and vice versa), or a single vortex tube (7) can be rotated in increments for example of 180 degrees as shown by arrow 14.

The reverse process releases the same amount of energy that was absorbed previously.

Since phase change of material (latent heat) requires significantly more energy than heating or cooling, the object of the invention is to operate as close as possible at the phase change point/temperature. In other words the invention forces the PCM accumulator (2,3) to change its state as many times as possible in a certain time of period.

Once the temperature difference of indoor and outdoor air/gas/fluid is enough to make a phase change of material available, the vortex tube (6-8) can be turned off.

On the other hand the use of vortex tube (6-8) enables to use the invention when temperature difference of outdoor and indoor condition is not enough to make phase change take place, or the target is not to use the difference of temperatures. In the case fluid recycles in the space through the invention, where it warms/cools. Regarding air, there is no ventilation, the invention is a heater/cooler only.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A phase change material heat exchanger device, comprising:
   at least first and second heat exchanger cells, each dimensioned for fluid flow therethrough, with fluid flow directions that alternately reverse within each cell while remaining mutually opposite, at least one of said first and second heat exchanger cells comprising a phase change material (PCM) accumulator,
   means for alternately reversing said fluid flow directions through said first and second heat exchanger cells, so that said fluid flow directions remain mutually opposite,
   a vortex tube having an inlet port, a first outlet port, and a second outlet port, and
   a fluid-tight chamber in which the vortex tube is located, wherein the outlet ports of the vortex tube lead to one of the following: said first heat exchanger cell, said second heat exchanger cell or outside said heat exchanger device.

2. The phase change material (PCM) heat exchanger device as defined in claim 1, wherein when the temperature difference of the fluid flows from and to the device is sufficient to activate the phase change material (PCM) accumulator, the operation of the vortex tube is turned off.

3. The phase change material (PCM) heat exchanger device as defined in claim 1, wherein a plurality of cyclically operating phase change material (PCM) accumulators are provided in respective heat exchanger cells.

4. The phase change material heat exchanger device of claim 3 wherein at least some of the plurality of cyclically operating phase change (PCM) accumulators have different operating temperature ranges.

5. The phase change material (PCM) heat exchanger device as defined in claim 1, wherein each phase change material (PCM) heat exchanger cell is dimensioned for use in one of the following: a building, a vehicle, a submarine, an airplane, a transportation container, a computer, a cryogenic device, a space technology application, and a supercritical carbon dioxide application.

6. A phase change material heat exchanger device, comprising:
   first and second heat exchanger cells, each cell dimensioned for fluid flow therethrough, with fluid flow directions that alternately reverse within each cell while remaining mutually opposite, at least one of said first and second heat exchanger cells comprising a phase change material (PCM) accumulator,
   means for alternately reversing said fluid flow directions through said first and second heat exchanger cells, so that said fluid flow directions remain mutually opposite,
   a chamber adjacent said first and second heat exchanger cells, and
   a vortex tube having an inlet port for receipt of compressed air, a first outlet port configured to dispense warm air, and a second outlet port configured to dispense cold air, the vortex tube located within the chamber so as to deliver cooling or heating to said first heat exchanger cell.

7. The phase change material heat exchanger device as defined in claim 6, wherein said delivery of heating or cooling by said vortex tube to said first heat exchanger cell is also provided to the second heat exchanger cell when the fluid flow directions through the heat exchanger cells are alternately reversed by said means for alternately reversing fluid flow directions of through said first and second heat exchanger cells.

8. The phase change material heat exchanger device as defined in claim 7, wherein the second outlet port of the vortex tube is configured to deliver cool air to the second heat exchanger cell while the first outlet port of the vortex tube delivers warm air to the first heat exchanger cell and wherein this delivery is reversed when the fluid flow directions through the first and second heat exchanger cells are alternately reversed by said means for alternately reversing said fluid flow directions through said first and second heat exchanger cells.

9. The phase change material heat exchanger device as defined in claim 6, wherein the vortex tube is configured so that the outlet port not delivering cooling or heating to said first heat exchanger cell is positioned outside the heat exchanger device so that heating or cooling that is not delivered to the first heat exchanger cell is delivered outside said heat exchanger device.

10. The phase change material heat exchanger device as defined in claim 6, further comprising a second vortex tube located within the chamber or in an additional chamber of the heat exchanger device adjacent said first and second heat exchanger cells so as to deliver cooling or heating to said first heat exchanger cell and/or said second heat exchanger cell.

11. The phase change material heat exchanger device as defined in claim 10, wherein each vortex tube is configured so that the outlet port not delivering cooling or heating to said first heat exchanger cell and/or said second heat exchanger cell is positioned outside the heat exchanger device so that heating or cooling that is not delivered to the first heat exchanger cell and/or said second heat exchanger cell is delivered outside said heat exchanger device.

12. The phase change material heat exchanger device as defined in claim 6, wherein the chamber is a fluid-tight chamber.

13. The phase change material heat exchanger device as defined in claim 12, wherein heating or cooling by the vortex tube that is not delivered to one of the first and second heat exchanger cells is delivered outside said heat exchanger device.

14. The phase change material heat exchanger device as defined in claim 13, wherein a plurality of cyclically operating phase change material (PCM) accumulators are positioned in at least one of the first and second heat exchanger cells.

* * * * *

UNITED STATES PATENT AND TRADEMARK OFFICE
CERTIFICATE OF CORRECTION

| | | |
|---|---|---|
| PATENT NO. | : 8,522,859 B2 | Page 1 of 1 |
| APPLICATION NO. | : 11/886104 | |
| DATED | : September 3, 2013 | |
| INVENTOR(S) | : Moilala et al. | |

It is certified that error appears in the above-identified patent and that said Letters Patent is hereby corrected as shown below:

In the Claims

Column 8, line 20, claim 7, line 7 delete the word "of".

Signed and Sealed this
Fourth Day of March, 2014

Michelle K. Lee
*Deputy Director of the United States Patent and Trademark Office*